United States Patent [19]

Creehan

[11] Patent Number: 5,566,892

[45] Date of Patent: * Oct. 22, 1996

[54] PROCESS FOR PREPARING COMPOSITE STRUCTURES

[75] Inventor: Robert D. Creehan, Arlington, Mass.

[73] Assignee: Hyperion Catalysis Int'l, Inc., Cambridge, Mass.

[*] Notice: The portion of the term of this patent subsequent to Aug. 29, 2012, has been disclaimed.

[21] Appl. No.: 456,658

[22] Filed: Jun. 2, 1995

Related U.S. Application Data

[63] Continuation of Ser. No. 896,317, Jun. 10, 1992, Pat. No. 5,445,327, which is a continuation of Ser. No. 386,912, Jul. 27, 1989, abandoned.

[51] Int. Cl.$^6$ .......................... B02C 19/00; B02C 19/12
[52] U.S. Cl. .................. 241/22; 241/26; 241/27
[58] Field of Search ................... 241/14, 15, 22, 241/23, 24, 26, 27, 30

[56] References Cited

U.S. PATENT DOCUMENTS

| | | | |
|---|---|---|---|
| 3,275,590 | 9/1966 | Thomas | 428/367 |
| 3,744,726 | 7/1973 | Groszek | 241/30 |
| 3,799,455 | 3/1974 | Szegvari et al. | 241/27 |
| 4,251,576 | 2/1981 | Osborn et al. | 428/331 |
| 4,579,587 | 4/1986 | Grant et al. | 75/0.5 R |
| 4,627,959 | 12/1986 | Gilman et al. | 419/61 |
| 4,663,230 | 5/1987 | Tennent | 428/367 |
| 4,703,898 | 11/1987 | Nakagawa et al. | 241/30 |
| 4,816,289 | 3/1989 | Komatsu | 428/367 |
| 4,981,535 | 1/1991 | Hadermann et al. | 149/19.92 |
| 4,989,794 | 2/1991 | Askew et al. | 241/16 |
| 5,445,327 | 8/1995 | Creehan | 241/22 |

FOREIGN PATENT DOCUMENTS

| | | |
|---|---|---|
| 63-286468 | 11/1988 | Japan . |
| WO87/01317 | 3/1987 | WIPO . |
| WO87/07559 | 12/1987 | WIPO . |

*Primary Examiner*—John Husar
*Attorney, Agent, or Firm*—Curtis Morris & Safford, P.C.; Barry Evans, Esq.

[57] ABSTRACT

A compounding process for preparing a composite that includes introducing one or more fillers and a matrix material into a stirred ball mill and subjecting the fillers and the matrix material to a combination of shear and impact forces under reaction conditions including reaction time sufficient to reduce the size of agglomerates formed by the fillers to a value below a pre-determined value to disperse the fillers throughout the matrix material.

30 Claims, No Drawings

PROCESS FOR PREPARING COMPOSITE STRUCTURES

This application is a continuation of application Ser. No. 07/896,317, filed Jun. 10, 1992, now U.S. Pat. No. 5,445,327, which is a continuation of Ser. No. 07/386,912, filed Jul. 27, 1989, now abandoned.

BACKGROUND OF THE INVENTION

This invention relates to preparing composites.

Various processes exist for dispersing solid fillers (e.g., fibrous or particulate fillers) in solid or liquid matrices. These processes include compounding the filler-matrix mixture using blade mixers, high shear Waring-type blenders, roll mills, dough mixers, or internal Brabender-type mixers.

Carbon fibrils are carbon filaments having diameters less than 500 nanometers. Examples of particular carbon fibrils and methods for preparing them are described in Snyder et al., U.S. Ser. No. 149,573 ("Carbon Fibrils") filed Jan. 28, 1988, now abandoned; Tennent, U.S. Pat. No. 4,663,230 ("Carbon Fibrils, Method for Producing Same and Compositions Containing Same"); Tennent et al., U.S. Ser. No. 871,676 filed Jun. 6, 1986 ("Novel Carbon Fibrils, Method for Producing Same and Compositions Containing Same") now U.S. Pat. No. 5,165,909; Tennent et al., U.S. Ser. No. 871,675 filed Jun. 6, 1986 ("Novel Carbon Fibrils, Method for Producing Same and Encapsulated Catalyst") now abandoned; Mondeville et al., U.S. Ser. No. 285,817 filed Dec. 16, 1988 ("Fibrils") now abandoned; and McCarthy et al., U.S. Ser. No. 351,967 filed May 15, 1989 ("Surface Treatment of Carbon Microfibers") now abandoned, all of which are assigned to the same assignee as the present application and are hereby incorporated by reference in their entirety.

SUMMARY OF THE INVENTION

In general, the invention features a compounding process for preparing a composite that includes the steps of introducing one or more fillers and a matrix material into a stirred ball mill, and subjecting the fillers and matrix material to a combination of shear and impact forces under reaction conditions including reaction time sufficient to reduce the size of agglomerates formed by the fillers to a value below a pre-determined value to disperse the fillers throughout the matrix material.

In preferred embodiments, the pre-determined value of the agglomerate size is no greater than 1000 times the size of the filler, more preferably no greater than 100 times, even more preferably no greater than 10 times. One or more of the characteristic dimensions of the filler (which is a measure of its size) preferably is less than 1 μm, more preferably less than 0.1 μm.

A viscosity modifier (i.e. a material that modifies the intrinsic viscosity of the matrix-filler mix to facilitate dispersion) is preferably added to the stirred ball mill. Preferred viscosity modifiers include both materials that are removed following the dispersion step, e.g., solvents, and materials that are retained following the dispersion step; an example of the latter type of viscosity modifier is a reactive diluent that chemically reacts with the matrix material. In additional preferred embodiments, one or more milling media (i.e. a particulate material that facilitates dispersion by supplying additional impact force) is added to the stirred ball mill.

Preferred fillers include whiskers (i.e. single crystal fibers), discontinuous fibers, particulate fillers, and carbon fibrils. The fibrils preferably are tubes having graphitic layers that are substantially parallel to the fibril axis. One aspect of substantial parallelism is that the projection of the graphite layers on the fibril axis extends for a relatively long distance in terms of the external diameter of the fibril (e.g., at least two fibril diameters, preferably at least five diameters), as described in Snyder et al., U.S. Ser. No. 149,573, now abandoned. These fibrils preferably are also free of a continuous thermal carbon overcoat (i.e. pyrolytically deposited carbon resulting from thermal cracking of the gas feed used to prepare the fibrils). The fibrils preferably have diameters between 3.5 and 75 nanometers, inclusive, and a length to diameter ratio of at least five. Also preferred are fibrils having this morphology in which the outer surface of the graphitic layers is bonded to a plurality of oxygen-containing groups (e.g., a carbonyl, carboxylic acid, carboxylic acid ester, epoxy, vinyl ester, hydroxy, alkoxy, isocyanate, or amide group), or derivatives thereof (e.g., a sulfhydryl, amino, or imino group).

Preferred matrix materials include metal powder, ceramic powder (e.g., glass powder), thermoplastic resins, thermoset resins, and elastomers, and matrix materials which are in the form of liquids. Preferred thermoplastic resins include thermoplastic polyester (e.g., polyethylene terephthalate), polyurethane, polyether ether ketone, polyether sulfone, polyether imide, polyamide (e.g., nylon), and polyurea resins. Preferred thermoset resins include phenolic, epoxy, thermosetting polyurethane, thermosetting polyester (e.g., alkyd), polyimide, bismaleimide, polycyclopentadiene, and vinylacrylimide (such as the Arimix resins commercially available from Ashland Chemical Co., Columbus, Ohio). Preferred elastomers include styrene-butadiene rubber, natural rubber, ethylene-propylene-diene monomer (EPDM) rubber, silicone rubber, polybutadiene (both cis and trans 1,4 and 1,2-polybutadiene), polyisoprene, neoprene, chloroprene, fluoroelastomers (e.g., fluorinated polyethylene), and urethane elastomers.

When the matrix material is a thermoplastic resin, the compounding process preferably includes cooling the contents of the stirred ball mill to a temperature at which the matrix material becomes brittle prior to the dispersion step, and maintaining that temperature throughout the dispersion step.

The invention also features a composite prepared according to the above-described process.

The invention creates composites in which the filler is substantially uniformly dispersed throughout the matrix material, even when the mean filler diameter is on the order of a micron or less, leading to improved composite properties, e.g., electrical, optical, mechanical, and magnetic properties. The degree of uniformity (as measured by the size of the filler agglomerates) can be tailored to the particular application for which the composite is intended by adjusting the milling time.

The invention also makes it possible to co-disperse a variety of fillers having different diameters and/or shapes in a matrix. Moreover, the invention obviates the need for pre-treating the filler surface or adding chemical dispersants to achieve good filler dispersion throughout the matrix.

Other features and advantages will be apparent from the following description of the preferred embodiments thereof, and from the claims.

DESCRIPTION OF THE PREFERRED EMBODIMENTS

Composites are preferably prepared by introducing the matrix material and one or more fillers into a stirred ball mill of the type conventionally used for powder comminution. In the mill, these materials are subjected to both shearing forces due to the stirring action of a mechanical rotor and impact forces due to particulate milling media of the type conventionally used for powder comminution which are added to the mill during stirring; these particulates are removed once the milling operation is over. In the case of metal and ceramic matrices, however, it is not necessary to add separate milling media because the matrices themselves (which are added in the form of powders) are capable of supplying the impact force.

A viscosity modifier is added to viscous matrix-filler mixes to lower the intrinsic viscosity to a value sufficiently low to permit easy milling. Viscosity modifiers are particularly useful when the matrix material is a high molecular weight thermoplastic or a partially cured thermoset resin. Examples of suitable viscosity modifiers include solvents such as water, toluene, acetone, methyl ethyl ketone (MEK), isopropanol, or mineral oil. Following the milling operation the solvent is removed, e.g., by vacuum drying, steam stripping, or freeze drying. The viscosity modifier may also be a material which becomes part of the matrix or filler once milling is complete. Examples of such modifiers include monomers called reactive diluents (e.g., styrene, triallyl cyanurate, diallycyanurate, multi-functional acrylates, and divinylbenzene) which chemically react with the matrix material during milling. The viscosity modifier may also be built into the matrix. In such cases, the viscosity modifier may be present during manufacture of the matrix, e.g., in solutions of solution-polymerized SBR and solutions of thermoplastics obtained from the polymerization reaction.

Suitable fillers include discontinuous fibers (e.g., chopped glass or carbon fibers), whiskers (e.g., carbon or silicon carbide whiskers), particulate fillers (e.g., silica or carbon black), carbon fibrils, or a combination of any or all of these fillers. Preferably, the mean filler diameter (i.e. the diameter of the individual grains or fibers making up the filler) is on the order of a micron or less. Preferred fibrils have small diameters (preferably between 3.5 and 75 nanometers), graphitic layers that are substantially parallel to the fibril axis, and are substantially free of a continuous thermal carbon overcoat, as described in Tennent, U.S. Pat. No. 4,663,230, now abandoned; Tennent et al.; U.S. Ser. No. 871,675, now abandoned; Tennent et al., U.S. Ser. No. 871,676, now U.S. Pat. No. 5,165,909; Snyder et al., U.S. Ser. No. 149,573, now abandoned; and Mandeville et al., U.S. Ser. No. 285,817, now abandoned. These fibrils are prepared as described in the aforementioned patent and patent applications. The fibrils may also be treated to introduce oxygen-containing functional groups onto the fibril surface, as described in McCarthy et al., U.S. Ser. No. 351,967, now abandoned.

Preferred matrix materials include metal and ceramic (e.g., glass) powders, and organic matrices, e.g., thermoplastic, thermoset, and elastomer resins, as described in the Summary of the Invention, above. The preparation of carbon fibril-filled elastomers is described in Barber et al., U.S. Ser. No. 859,611 entitled "Fibril-Filled Elastomers", now abandoned, filed concurrently with the present application and assigned to the same assignee as the present application, and is hereby incorporated by reference in its entirety. In the case of thermoplastic resins, the composites are preferably prepared by introducing the resin and fillers into the stirred ball mill, and then adding dry ice to the mill to cool the contents to a temperature at or near which the resin is transformed into a brittle solid. In this form, the resin is more easily broken up during milling, leading to more uniform dispersions. The dry ice evaporates during milling so that none is retained in the final dispersion.

The milling time determines the final size of the filler agglomerates and thus the degree of dispersion, which in turn is a function of the end use for which the composite is targeted. For example, electrical applications, which rely on interparticle contact to establish a conductive network, can tolerate larger agglomerates than mechanical applications, where the agglomerates act as strength-lowering defects.

A composite in which carbon fibrils (prepared as described above) were dispersed in a styrene butadiene rubber (SBR) matrix was prepared using the above-described stirred ball milling procedure and its properties compared to a fibril-reinforced SBR matrix prepared using conventional internal mixing and roll milling compounding techniques. The results, which are shown in Table I, demonstrate that the composite prepared using the stirred ball mill exhibits superior properties.

TABLE I

| Property | Roll Mill | Ball Mill |
| --- | --- | --- |
| Ultimate Tensile Strength (MPA) | 6.7 | 10.1 |
| Elongation at Break (%) | 255 | 395 |
| Modulus at Elongation (MPa) | | |
| 100% | 2.8 | 3.1 |
| 200% | 5.2 | 5.4 |
| 300% | — | 7.5 |
| Hardness (IRHD) | 64 | 64 |
| Trouser Tear (KN/M) | 5.4 | 6.0 |
| Ring Fatigue (Kilocycles to failure | 12 | 40 |
| DIN Abrasion: | | |
| Loss (mm$^3$) | 203 | 189 |
| Index | 95 | 102 |
| Heat Build-up (°C.) | 70 | 65 |
| Resistivity (Ω cm) | 2190 | 42 |

Other embodiments are within the following claims.

For example, the compounding method can be used to prepare prepregs for hybrid composites as described in Creehan et al., U.S. Ser. No. 386,822 entitled "Hybrid Composites", now abandoned, filed concurrently with the present application and assigned to the same assignee as the present application, and is hereby incorporated by reference in its entirety.

I claim:

1. A compounding process for preparing a composite comprising the steps of:

mixing at least one filler and a matrix material thereby forming a mixture; and subjecting said fillers and said matrix material to a combination of shear and impacted forces under reaction conditions including reaction time sufficient to reduce the size of agglomerates formed by said fillers to a value no greater than 1000 times the size of said filler to disperse said fillers throughout said matrix material.

2. The compounding process of claim 1 wherein said value of said agglomerate size is no greater than 100 times the size of said filler.

3. The compounding process of claim 2 wherein said value of said agglomerate size is no greater than 10 times the size of said filler.

4. The compounding process of claim 3, wherein one or more of the characteristic dimensions of said filler is less than one micron.

5. The compounding process of claim 2, wherein one or more of the characteristic dimensions of said filler is less than one micron.

6. The compounding process of claim 1 wherein at least one of the characteristic dimensions of said filler is less than 0.1 μm.

7. The compounding process of claim 1 further comprising adding a viscosity modifier to said mixture.

8. The compounding process of claim 7 wherein said viscosity modifier is removed following the dispersion step.

9. The compounding process of claim 8 wherein said viscosity modifier is a solvent.

10. The compounding process of claim 7 wherein said viscosity modifier is retained following the dispersion step.

11. The compounding process of claim 10 wherein said viscosity modifier is a reactive diluent that chemically reacts with said matrix material.

12. The compounding process of claim 1 further comprising adding at least one milling media to said mixture.

13. The compounding process of claim 1 wherein said filler comprises whiskers.

14. The compounding process of claim 1 wherein said filler comprises discontinuous fibers.

15. The compounding process of claim 1 wherein said filler comprises a particulate filler.

16. The compounding process of claim 1 wherein said filler comprises carbon fibrils.

17. The compounding process of claim 16 wherein said fibrils are substantially free of a continuous thermal carbon overcoat.

18. The compounding process of claim 17 wherein the fibrils comprises tubes having graphitic layers and the outer surface of said graphitic layers has bonded thereto a plurality of oxygen-containing groups or derivatives thereof.

19. The compounding process of claim 1 wherein said matrix material comprises a thermoset resin.

20. The compounding process of claim 19 wherein said thermoset resin is a phenolic, epoxy, thermosetting polyurethane, thermosetting polyester, polyimide, bismaleimide, polycyclopentadiene, or vinylacrylimide resin.

21. The compounding process of claim 1 wherein said matrix material comprises an elastomer.

22. The compounding process of claim 21 wherein said elastomer is styrene-butadiene rubber, natural rubber, ethylene-propylene-diene monomer rubber, silicone rubber, polybutadiene, polyisoprene, neoprene, chloroprene, fluoroelastomer, or a urethane elastomer.

23. The compounding process of claim 1 wherein said matrix material is in the form of a liquid.

24. The compounding process of claim 1 wherein said matrix material is a thermoplastic resin, said process further comprising cooling the contents of said mixture to a temperature at which said matrix material becomes brittle and maintaining said temperature throughout the dispersion step.

25. The compounding process of claim 1 wherein said matrix material is a thermoplastic or thermoset resin, said filler comprises carbon fibrils, and a viscosity modifier and milling media are added to said mixture.

26. The compounding process of claim 1, wherein one or more of the characteristic dimensions of said filler is less than one micron.

27. The compounding process of claim 1 wherein said matrix material comprises metal powder.

28. The compounding process of claim 1 wherein said matrix material comprises ceramic powder.

29. The compounding process of claim 1 wherein said matrix material comprises thermoplastic resin.

30. The compounding process of claim 1, wherein at least one dimension of said filler is between about 3.5 and 75 nanometers.

* * * * *